(12) United States Patent
Wu

(10) Patent No.: US 8,971,573 B2
(45) Date of Patent: Mar. 3, 2015

(54) VIDEO-TRACKING FOR VIDEO-BASED SPEED ENFORCEMENT

(75) Inventor: Wencheng Wu, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 104 days.

(21) Appl. No.: 13/611,718

(22) Filed: Sep. 12, 2012

(65) Prior Publication Data

US 2014/0072168 A1    Mar. 13, 2014

(51) Int. Cl.
*G06K 9/00*    (2006.01)

(52) U.S. Cl.
USPC ............................................. 382/103

(58) Field of Classification Search
None
See application file for complete search history.

(56) References Cited

U.S. PATENT DOCUMENTS

| | | | | |
|---|---|---|---|---|
| 5,280,530 | A * | 1/1994 | Trew et al. | 382/103 |
| 6,574,353 | B1 * | 6/2003 | Schoepflin et al. | 382/103 |
| 7,580,547 | B2 * | 8/2009 | Benhammou | 382/103 |
| 8,098,889 | B2 * | 1/2012 | Zhu et al. | 382/103 |
| 8,379,926 | B2 * | 2/2013 | Kanhere et al. | 382/104 |
| 8,582,811 | B2 * | 11/2013 | Wu et al. | 382/103 |
| 8,615,108 | B1 * | 12/2013 | Stoppa et al. | 382/103 |
| 8,749,691 | B2 * | 6/2014 | Tateishi et al. | 348/333.13 |
| 2006/0177099 | A1 * | 8/2006 | Zhu et al. | 382/104 |
| 2008/0069400 | A1 * | 3/2008 | Zhu et al. | 382/103 |
| 2008/0095403 | A1 * | 4/2008 | Benhammou | 382/104 |
| 2008/0273752 | A1 * | 11/2008 | Zhu et al. | 382/103 |
| 2008/0273806 | A1 * | 11/2008 | Friedrichs et al. | 382/236 |
| 2009/0174577 | A1 * | 7/2009 | Nakamura et al. | 340/995.1 |
| 2009/0175497 | A1 * | 7/2009 | Anai et al. | 382/103 |
| 2009/0175498 | A1 * | 7/2009 | Kochi et al. | 382/103 |
| 2010/0124358 | A1 * | 5/2010 | Huang et al. | 382/103 |
| 2010/0172543 | A1 * | 7/2010 | Winkler | 382/104 |
| 2010/0302362 | A1 * | 12/2010 | Birchbauer et al. | 348/135 |
| 2011/0040217 | A1 * | 2/2011 | Centen | 601/41 |
| 2011/0116687 | A1 * | 5/2011 | McDonald et al. | 382/105 |
| 2011/0123067 | A1 | 5/2011 | Podilchuk | |
| 2011/0170744 | A1 * | 7/2011 | Malinovskiy et al. | 382/103 |
| 2011/0251768 | A1 * | 10/2011 | Luo et al. | 701/70 |
| 2011/0293141 | A1 * | 12/2011 | Robert et al. | 382/103 |
| 2011/0311100 | A1 * | 12/2011 | Fan | 382/103 |
| 2012/0093361 | A1 * | 4/2012 | Huang et al. | 382/103 |
| 2012/0148094 | A1 * | 6/2012 | Huang et al. | 382/103 |

(Continued)

FOREIGN PATENT DOCUMENTS

CN    10266377 A    9/2012
EP    0807914 A1    11/1997

OTHER PUBLICATIONS

U.S. Appl. No. 13/411,032, filed Mar. 2, 2012, by Kozitsky et al.
U.S. Appl. No. 13/527,673, filed Jun. 20, 2012, by Hoover et al.
U.S. Appl. No. 13/453,089, filed Apr. 23, 2012, by Wu.
Comaniciu et al., "Real-time tracking of non-rigid objects using mean shift", in: Proceedings of IEEE Conference on Computer Vision and Pattern Recognition (CVPR'00), South Carolina, 2000, pp. 142-149.

(Continued)

*Primary Examiner* — Sumati Lefkowitz
*Assistant Examiner* — Thomas A James
(74) *Attorney, Agent, or Firm* — Fay Sharpe LLP

(57) ABSTRACT

A method for tracking a moving vehicle includes detecting the vehicle by acquiring a series of temporal related image frames. In an initial frame, the detecting includes locating a reference feature representative of a vehicle. The method further includes setting the reference feature as a full-size template. The method includes tracking the vehicle by searching a current frame for features matching the full-size template and at least one scaled template. The tracking further includes setting as an updated template one of the full-size and scaled templates closest matching the feature. The method includes repeating the tracking using the updated template for each next frame in the series.

20 Claims, 6 Drawing Sheets

(56) References Cited

U.S. PATENT DOCUMENTS

| | | | |
|---|---|---|---|
| 2012/0150651 A1* | 6/2012 | Hoffberg et al. | 705/14.58 |
| 2012/0166080 A1* | 6/2012 | Hung et al. | 701/448 |
| 2013/0058525 A1* | 3/2013 | Sugio | 382/103 |
| 2013/0176430 A1* | 7/2013 | Zhu et al. | 348/143 |
| 2014/0037142 A1* | 2/2014 | Bhanu et al. | 382/103 |
| 2014/0126780 A1* | 5/2014 | Wang, Jigang | 382/107 |

OTHER PUBLICATIONS

Gustafsson et al., "Particle Filters for Positioning, Navigation and Tracking", IEEE Transactions on Signal Processing, 2002.

UKIPO Search Report, Application No. GB1316092.4, Date of Search Mar. 10, 2014, Date of Mailing Mar. 11, 2014.

* cited by examiner

VIDEO-TRACKING FOR VIDEO-BASED SPEED ENFORCEMENT

BACKGROUND

The present disclosure is directed toward a method and system for tracking a feature moving across a series of temporal related image frames and, more specifically, for generating and dynamically applying multiple templates at different scales for updating a location of the feature in each frame. The present disclosure finds application in traffic surveillance. However, it is appreciated that the present exemplary embodiments are also amendable to other like applications.

Significant strides are being made toward a development and use of video-based traffic monitoring and enforcement systems. These systems are programmed to support a variety of tasks. Mainly, the systems are implemented to manage traffic flow and to enforce vehicle compliance with traffic laws, rules, and regulations.

A method 10 performed by a conventional system is illustrated in FIG. 1. A camera captures a video stream of a monitored region at S12. The camera may transmit video data to a remote server device for further processing starting at S14 or perform some or all of the processing on-board. This processing can be based on a function of the system. Generally, the processing can define a target area for detecting a vehicle. Using the processed information, the method 10 detects a vehicle in an initial frame at S16. The method tracks the vehicle across subsequent frames, using its features, at S18.

The example system is used for vehicle-based speed enforcement. Therefore in a parallel process, the system applies camera calibration to convert a trajectory of the tracked vehicle from pixel-to-real coordinates to real-world coordinates at S20. The system computes a vehicle speed at S22 using distance (i.e., by comparing the real-world coordinates between frames) and time measurements (e.g., by relating the number of frames by the frame rate). The calculated speed is used to determine a violation at S24 for purposes of issuing a ticket.

Because conventional systems are often used for fee collection and traffic enforcement, the tracking data needs to yield accurate measurements. However, conventional tracking approaches can tend to yield erroneous measurements.

One approach for tracking vehicles, especially for the purpose of speed calculation, includes template matching, which focuses on searching a frame for same point(s) that were included in a previous frame. However, the effects of noise and camera disturbance on measurements can cause this approach to suffer from inaccuracy.

Another approach for tracking includes the mean-shift algorithm, which focuses on finding locations between frames having the same and/or similar (statistical) characteristics. While this approach is more robust against noise and camera disturbance, it tends to provide less accurate results because the determined locations may not be exact. This approach is also more computationally expensive.

Another approach for object tracking can include particle filtering. All of these conventional approaches can be well suited for providing tracking results when a function of the system does not require a calculation using the exact position of a tracked object. However, for systems that require accurate position information for computing output, such as for the purpose of vehicle speed-enforcement, an improved tracking method is desired.

A system and method are needed for improving the accuracy of tracking a feature location in frames and for computing the measurements in real-time. A system is desired which is more robust against camera projective distortion.

BRIEF DESCRIPTION

One embodiment of the disclosure is directed toward a method for tracking a moving vehicle. The method includes detecting the vehicle by acquiring a series of temporal related image frames. In an initial frame, the detecting includes locating a reference feature representative of the vehicle. The method further includes setting the reference feature as a full-size template. The method includes tracking the vehicle by searching a current frame for features matching the full-size template and at least one scaled template. The tracking further includes setting as an updated template one of the full-size and scaled templates closest matching the feature. The method includes repeating the tracking using the updated template for each next frame in the series.

Another embodiment of a method for tracking a moving vehicle includes detecting the vehicle by acquiring a series of temporal related image frames. In an initial frame, the detecting includes locating a reference feature representative of a moving object. The method includes setting the reference feature as a template. The method further includes scaling the template a predetermined amount to generate a scaled template. The method includes tracking the moving object by searching the current frame for a feature matching the scaled template. The method includes storing a location of the feature in the current frame. The method repeats the tracking for each next frame in the series.

A further embodiment of the disclosure is directed toward a system for tracking a moving vehicle. The system includes a vehicle tracking device including a vehicle detection module, a vehicle tracking module, and a processor that is adapted to implement the modules. The vehicle detection module acquires a series of temporal related image frames. In an initial frame, the vehicle detection module locates a reference feature representative of a moving object. The vehicle tracking module sets the reference feature as a full-size template. The vehicle tracking module further searches a current frame for the feature matching the full size template and at least one scaled template. The vehicle tracking module sets as an updated template one of the full-size and scaled templates closest matching the feature. The vehicle tracking module repeats the tracking using the updated template for each next frame in the series.

DETAILED DESCRIPTION

The present disclosure is directed toward a method and system for tracking a location of a feature moving across a series of temporal related image frames using a multiple scale template matching approach, which includes generating and dynamically applying multiple templates at different scales for processing each frame. The method includes updating templates between frames for performing an additional template matching on each frame using a scaled version of an original and/or previous template. In this manner, the system can search for and identify more accurate matches between features in adjacent frames.

Figure 1:
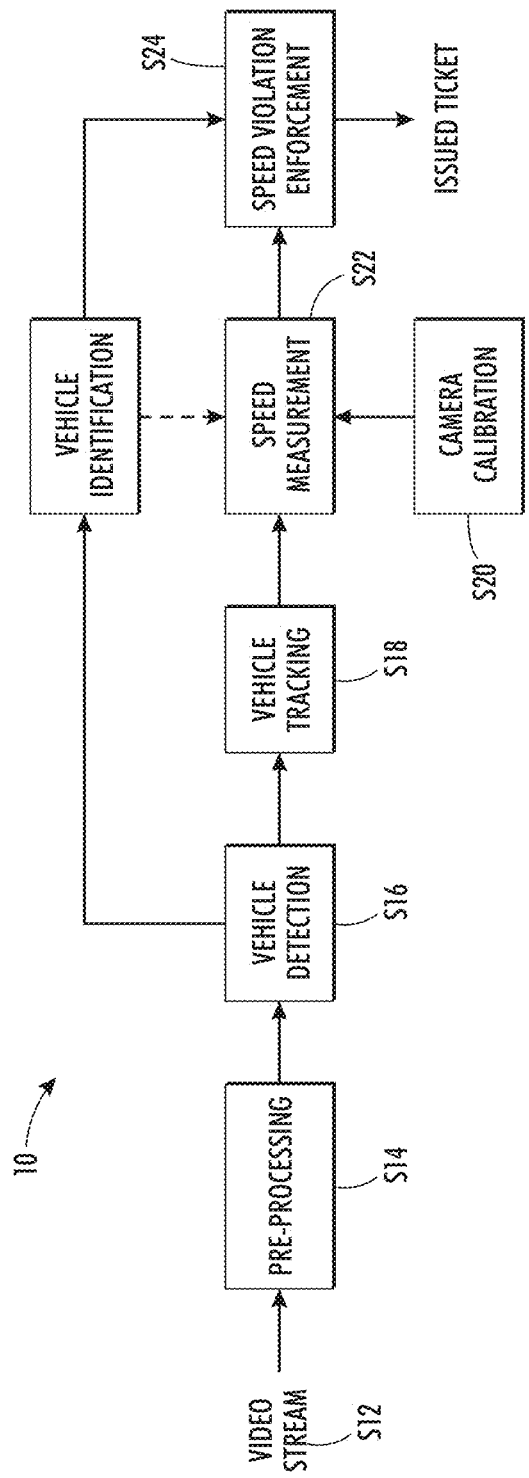
FIG. 1 is an overview of a PRIOR ART method for vehicle-based speed enforcement.
Figure 2:
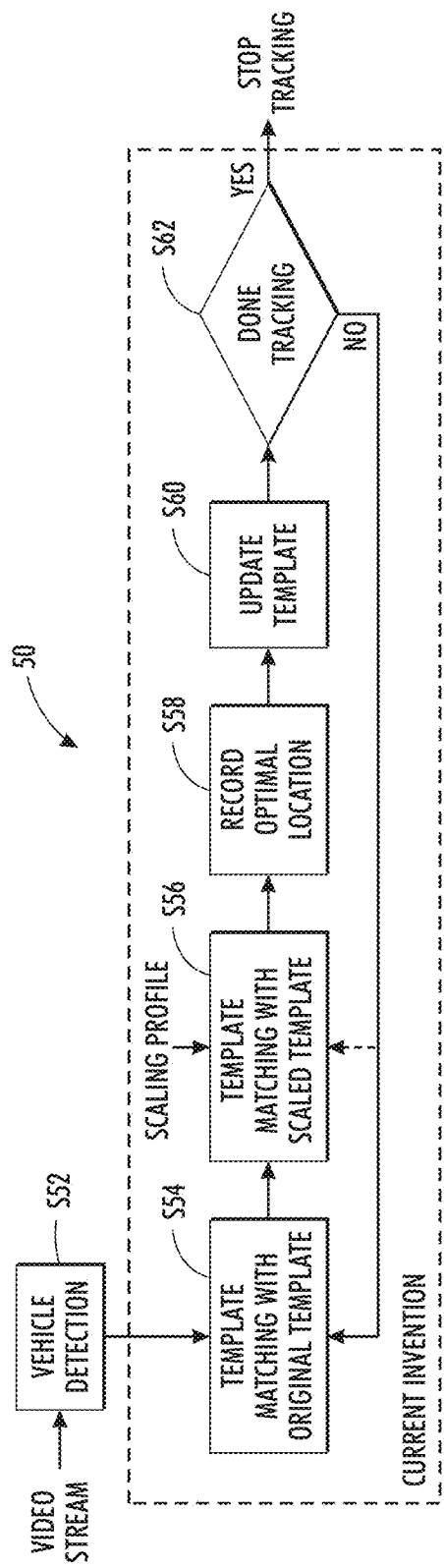
FIG. 2 is an overview of a method for tracking vehicles using a template-matching approach according to the present embodiment.

FIG. 2 provides an overview of the method 50. The method processes frames acquired from a camera. This processing includes detecting a reference feature, such as a vehicle or a specific part of a vehicle (e.g. license plate), in an initial frame and setting a region around the reference feature as an original template at S52. Using the original template at S54, template matching is performed on a current frame to locate target features matching the reference feature. A location and correlation is stored for the closest matching target feature. Using at least one scaled template at S56, template matching is further performed on the current frame to locate target features matching the reference feature. For each scaled template, a location and correlation is also stored for the closest matching target feature. The system records the stored location having the highest correlation score among the matching features determined by the scaled and non-scaled templates (S58). The template is updated at S60 using the image data of the current frame and the recorded location information. At S62, the system determines if the tracking for the said detected vehicle is complete for/after the current frame. This determination can be achieved in several ways. In one embodiment, the tracking of a vehicle is complete when the matching score is lower than a predetermined threshold for several frames. This is an indication that the vehicle has left the scene. In another embodiment, the tracking of a vehicle is complete when the current location of the tracked feature is outside of a predetermined region. This is an indication that the vehicle is about to leave the scene. In yet another embodiment, the tracking of a vehicle is complete when any of the above two conditions are met. Other methods that are commonly used in determining the completion of tracking (e.g. the object has become too small or the vehicle has been tracked long enough to conclude that it is indeed speeding etc.) are applicable as well. If the tracking is not considered as being complete for the current frame (NO at S62), the method returns to S54 for repeating the tracking on the next frame. If the tracking is considered as being complete for the current frame (YES at S62), the method stops. Note that for illustrative purposes, the disclosure describes this process in terms of tracking one vehicle. It is understood that in practice, the system is configured to track multiple vehicles in progress (i.e., several of the processes described above can be performed in parallel or in series or both depending on the actual traffic conditions).

Figure 3:
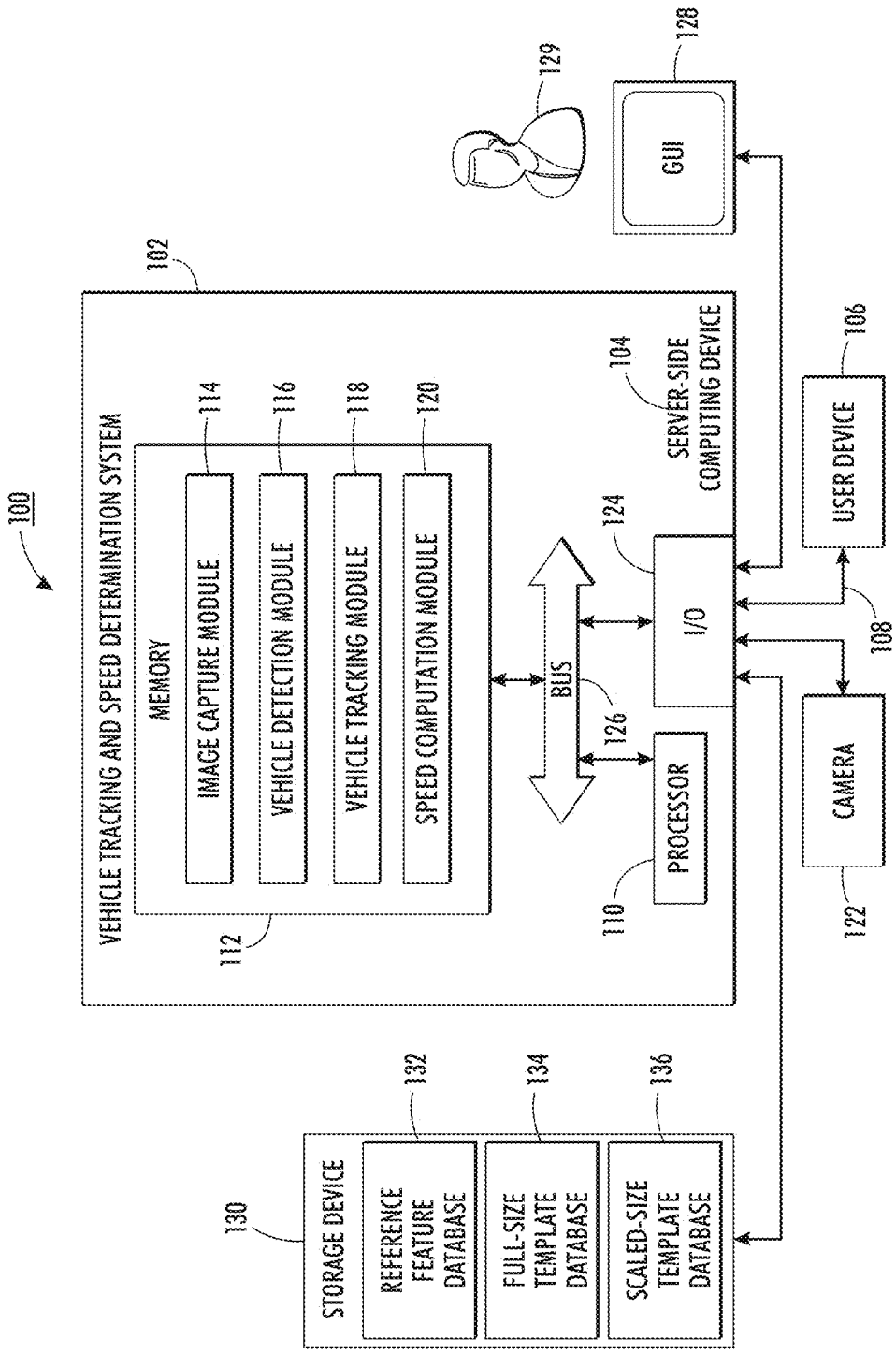
FIG. 3 is a schematic illustration of a traffic enforcement system in one aspect of the exemplary embodiment.

FIG. 3 is a functional block diagram of a traffic enforcement system 100 in one exemplary embodiment. The system 100 may include a vehicle tracking and speed determination system 102, hosted by a computing device 104, such as a server computer at the service provider site, and a user device 106, hosted by a computing device at a customer site, such as a server, which are linked together by communication links 108, referred to herein as a network. These components are described in greater detail below.

The vehicle tracking and speed determination system 102 illustrated in FIG. 3 includes a processor 110, which controls the overall operation of the vehicle tracking and speed determination system 102 by execution of processing instructions, which are stored in memory 112 connected to the processor 110.

The vehicle detection and tracking processes disclosed herein are performed by the processor 110 according to the instructions stored in the memory 112. In particular, the memory 112 stores image capture module 114, vehicle detection module 116, vehicle tracking module 118, and speed computation module 120.

The illustrated image capture module 114 acquires a plurality of temporal related frames from a camera 122.

The vehicle detection module 116 locates a reference feature representative of a moving object in an initial frame.

The vehicle tracking module 118 sets a cropped region around the reference feature as a full-size template. The module 118 scales the full-size template a predetermined amount to generate a scaled template. The module 118 searches a current frame for a feature matching the full-size and scaled templates. The module 118 then computes correlation numbers for describing a similarity between the feature and the full-size and scaled templates. The module 118 then sets as an updated template one of the full-size and scaled templates corresponding to the higher correlation number. The module 118 repeats this process for each next frame.

The speed computation module 120 uses the reference and updated feature locations from the tracking module 118 to compute a distance that the feature moves between the initial and last frame that the detected vehicle is tracked in the sequence. The module 120 computes a vehicle-speed using the distance.

The vehicle tracking and speed determination system 102 also includes one or more communication interfaces (I/O), such as network interfaces 124 for communicating with external devices, such as the user device 106. The various hardware components 110, 112, 124 of the vehicle tracking and speed determination system 102 may all be connected by a bus 126.

With continued reference to FIG. 3, the vehicle tracking and speed determination system 102 is communicatively linked to a user interface device (GUI) 128 via a wired and/or wireless link. In various embodiments, the user interface device 128 may include one or more of a display device, for displaying information to users, such as a notification of a violating vehicle to a human operator 129 for review, and a user input device, such as a keyboard or touch or writable screen, for inputting instructions, and/or a cursor control device, such as a mouse, trackball, or the like, for communicating user input information and command selections to the processor 110. Specifically, the user interface device 128 includes at least one of an input device and an output device, both of which include hardware, and which are communicatively linked with the server 104 via wired and/or wireless link(s).

With continued reference to FIG. 3, the traffic enforcement system 100 includes a storage device 130 that is part of or in communication with the vehicle tracking and speed determination system 102. In one embodiment, the vehicle tracking and speed determination system 102 can be in communication with a server (not shown) that hosts storage device 130, for storing at least one of a reference feature database 132, a full-size template database 134, and a scaled template database 136.

While the computing device 104 may be linked to as few as one camera 122, in general, it can be linked to a plurality of cameras. The camera 122 is not limited to any one type of camera. Rather, still cameras and video cameras are contemplated for surveying a desired region. The camera 122 is adapted to capture a plurality of image frames and transmit the image and/or video data to the vehicle tracking and speed determination system 102. In the contemplated embodiment, the camera 122 can be used for speed enforcement applications, but the purpose of the system 100 is not limited to any one application.

The memory 112, 130 may represent any type of tangible computer readable medium such as random access memory (RAM), read only memory (ROM), magnetic disk or tape, optical disk, flash memory, or holographic memory. In one embodiment, the memory 112, 130 may each comprise a combination of random access memory and read only memory. The digital processor 110 can be variously embodied, such as by a single-core processor, a dual-core processor (or more generally by a multiple-core processor), a digital processor and cooperating math coprocessor, a digital controller, or the like. The digital processor 110, in addition to controlling the operation of the respective vehicle tracking and speed determination system 102, executes instructions stored in memory 112, 130 for performing the parts of the method outlined below.

The software modules as used herein, are intended to encompass any collection or set of instructions executable by the vehicle tracking and speed determination system 102 so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on the server or other location to perform certain functions.

The communication interfaces 124 may include, for example, a modem, a router, a cable, and and/or Ethernet port, etc.

As will be appreciated, while two computing devices 104, 106 are illustrated by way of example, the system 100 may be hosted by fewer or more linked computing devices. Each computing device may include, for example, a server computer, desktop, laptop, or tablet computer, smartphone or any other computing device capable of implementing the method described herein.

Figure 4A:
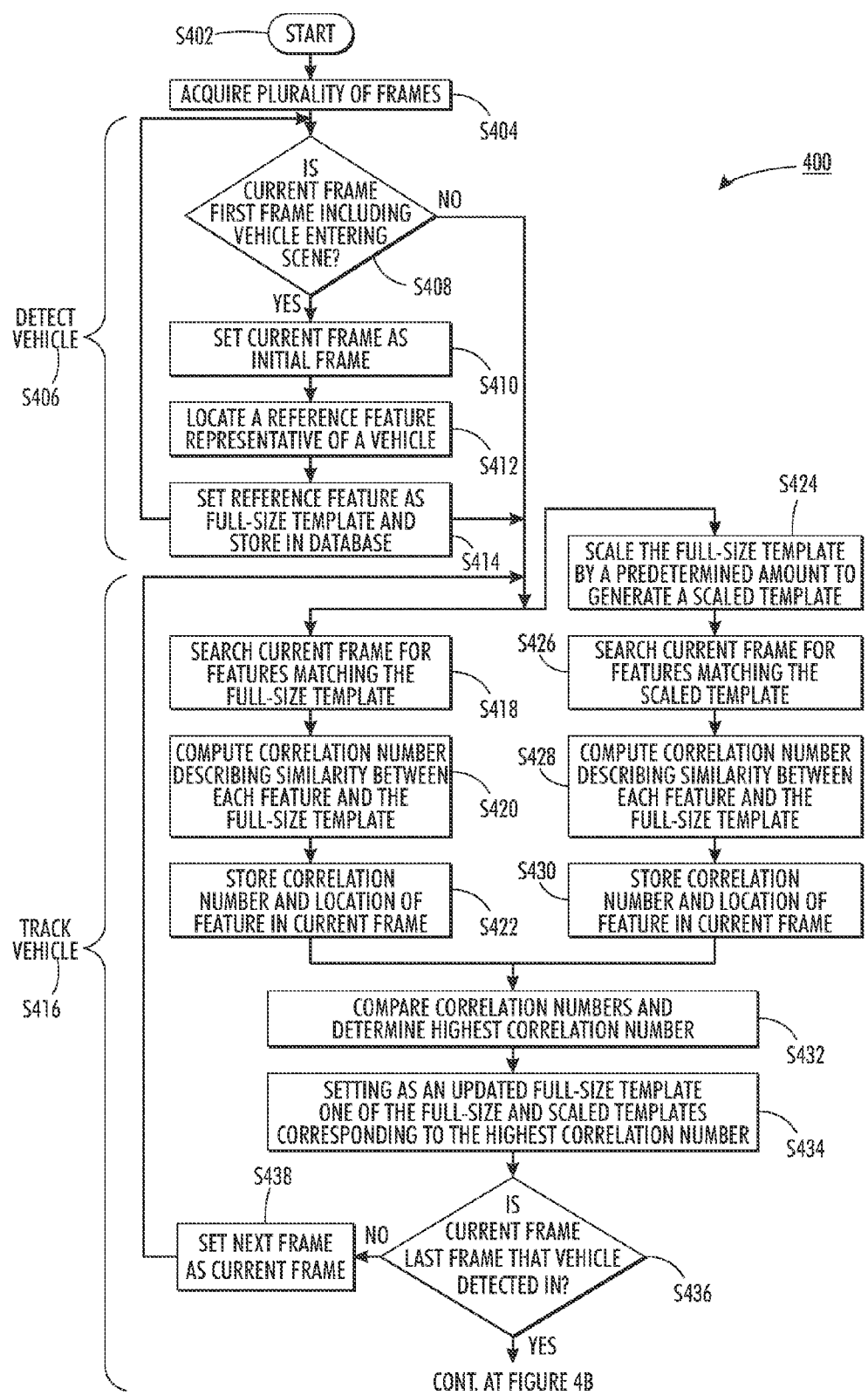
FIG. 4 is a flow chart illustrating an exemplary method for template matching according to another aspect of the exemplary embodiment.
Figure 4B:
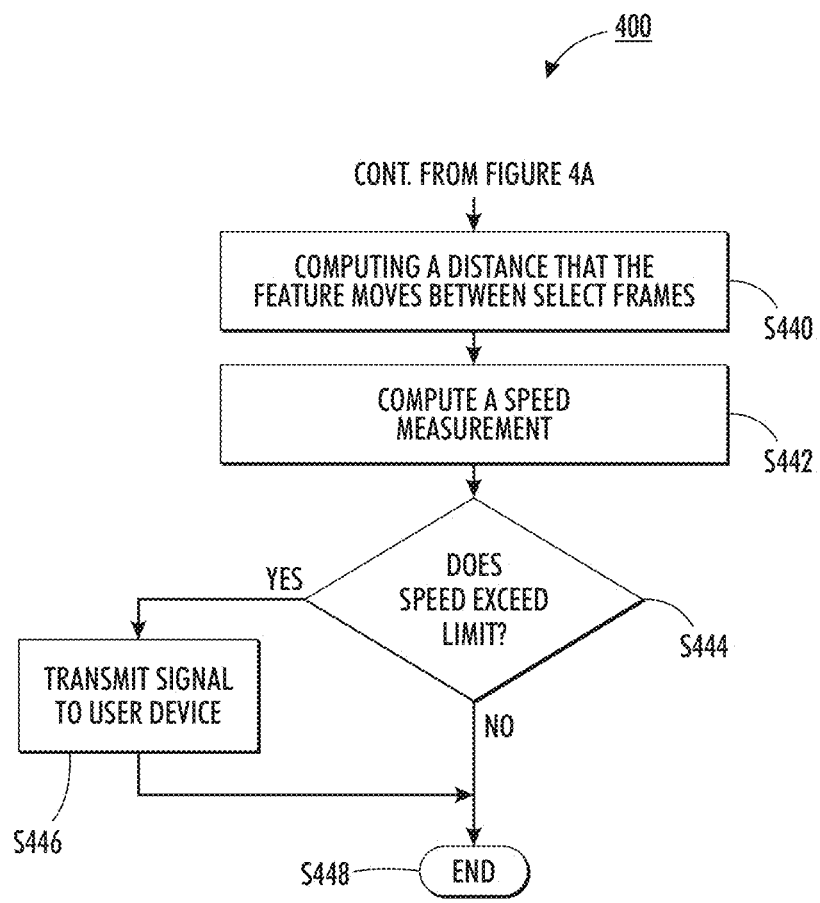

FIG. 4 is a flow chart illustrating an exemplary method 400 for template matching. The method starts at S402. The method begins when the image capture module 114 acquires a series of temporal related image frames from the camera 122 at S404. The image frames can be captured at the camera 122 and processed at the camera. In another embodiment, the image frames can be transmitted to the computing device 104 for processing. The image frames can be provided as a video stream captured by a video camera or they can include a series of still frames captured in succession by a still camera. For illustration purposes, the description herein is directed toward image frames provided as video data from a video stream and, more specifically, to a video based speed enforcement system, although it is contemplated that the teachings provided herein can be applied in other traffic enforcement systems.

The system first detects a vehicle in the video data that is provided to the system 100. When processing the video data, the vehicle detection module 116 detects whether a new vehicle has entered the scene at S406. The module 116 can perform the detection by applying a process understood in the art, such as license plate detection. There is no limitation made herein to the process used to detect a vehicle.

The module 116 determines if the current frame is the first frame capturing a new vehicle (i.e. not yet been tracked in 416) entering the scene at S408. For the current frame being an initial frame including the vehicle in the sequence (YES at S408), the module 116 sets the current frame as an initial frame of a new vehicle at S410. In the initial frame, the vehicle determination module 116 locates a reference feature representative of the vehicle at S412. In one example, this feature can include a portion of a license plate. In another embodiment, multiple features can be identified. In the illustrated example, select corners (such as, an upper/lower left/right) of a license plate can be identified. The module 116 sets the reference feature as a full-size (e.g., m×n) template at S414. In one embodiment, the module 116 can crop a region around the feature and set the cropped region as the full-size template. In the case of multiple features being used, multiple templates can each be centered on the select features, respectively. The module 116 can also store the reference feature in the reference feature database 132 and the full-size template in the same or a different full-size template database 134.

For the current frame not being the first frame (NO at S408), the vehicle detection module 116 can transmit the reference feature information and/or the full-size template to the vehicle tracking module 118 for tracking a location of the vehicle at S416. In another embodiment, the module 118 can access this information from storage. Generally, the vehicle tracking module 118 initiates a matching process for tracking the vehicle until the vehicle exits the scene or a violation determination is made.

The tracking (S416) includes performing a template matching approach on a current frame. Using the full-size template, an updated location of the vehicle is determined as it moves across the scene between the reference and current frame. Generally, the tracking module 118 searches the current frame for a feature matching the full-size template at S418. The module 118 computes a correlation number for describing a similarity between the feature and the full-size template at S420. The computed correlation number and a best-matched location of the feature in the current frame are stored for further processing at S422.

Figure 5A:
FIGS. 5A and 5B show enhanced frames capturing an example scenario including a select vehicle portion shrinking in size as the vehicle moves away from a camera.
Figure 5B:
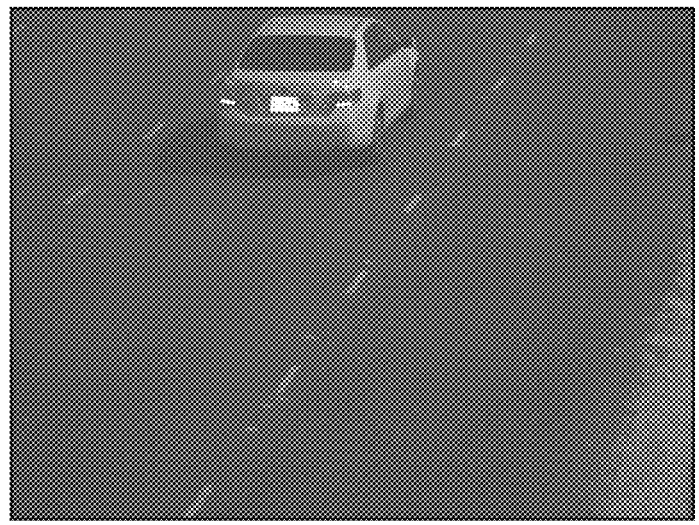

In a parallel process, the vehicle tracking module 118 performs a dynamic template matching approach by similarly searching the current frame for the feature using at least one scaled version of the full-size template. In one illustrated example, a video-based speed enforcement system can use a camera configuration that captures a scene similar to the one shown in the enhanced frames of FIGS. 5A and 5B. In the example scenario, a vehicle moves away from the camera as it travels across the scene, as indicated by its positions in the lower left corner of FIG. 5A and the upper-right corner of FIG. 5B. As shown in FIGS. 5A-B, the size of the license plate shrinks from frame to frame as the vehicle moves away from the camera. Accordingly, the present disclosure provides the dynamic template matching approach which searches the current frame for the feature using a scaled (e.g., shrunk by 5% here) template that may provide a more accurate updated location of the vehicle as it moves relative to the camera.

Continuing with FIG. 4, the vehicle tracking module 118 scales the full-size template by a predetermined amount to generate a scaled template at S424. In one embodiment, a fixed scale can be applied to scale the full-size template the predetermined amount. The predetermined amount can be a value that is less than 1 for embodiments including a camera position that captures a vehicle moving away from the camera. However, embodiments are contemplated for increasing the size of the template for tracking features moving toward the camera. In the contemplated embodiment, for example, the predetermined amount can be in a range approximating 95% and 105% of the full-size template.

In another embodiment, a more intelligent scaling profile can be computed using data that is based on knowledge of the camera configuration. For example, the scaling can be based on a mapping of image pixels to real-world coordinates, which are, for example, constructed via a typical camera calibration procedure. A scaling profile that is based on prior knowledge of the traffic scene being monitored is referred to as an intelligent scaling profile in this disclosure. The objects that are selected for the mapping can include and/or be derived from reference marks positioned on and/or near the targeted region that is being surveyed, such as a road and/or an indicator. In another contemplated embodiment the scaling can be computed using characteristics of tracked feature(s), such as a current location of the identified feature, an average vehicle speed of a current traffic scene that is being monitored by the camera, a scaling value from a previously tracked feature, and a combination of the above.

An initial scale can be determined before the tracking at S416. The scale can be refined after tracking a select number of frames. The modified scale amount can be based on predictive/adaptive scaling factors using knowledge of past scaling factors.

One aspect of applying a predetermined scaling factor(s) k to the full-size template is because the resulting scaled (dynamic) template(s) is used to locate the feature in each subsequent frame. The outcome of applying a scaled template to each frame in the same amount is equivalent to a scaling of $k^n$ strategy from frame n.

One aspect of scaling the full-size template at S424 is that other potential matches can be provided based on the number of additional scales that are explored. For each scaled template, an updated location of the vehicle is determined as it moves across the scene between the initial and current frame. Generally, the tracking module 118 searches the current frame for a feature matching the scaled template at S426. The module 118 computes a correlation number for describing a similarity between the feature and the scaled template at S428. The computed correlation number and a best-matched location of the feature in the current frame are stored for further processing at S430.

Multiple scaled templates can be used in the contemplated embodiment. A couple scales can be selected to sweep at a few points, rather than performing one sweep using all possible scales. The latter approach is equivalent to SIFT-like (Scale-Invariant Feature Transform) template matching, wherein many scales are tried for every frame and the best match is selected from among them. However, this approach increases computational costs and it fails to efficiently consider factors that are unique to each camera installation. For the present approach, which applies only a couple scaled templates that are each predetermined using the intelligent scaling profile, the matching process is accurate enough to sweep at only a few points for determining the best match.

With continued reference to FIG. 4, the vehicle tracking module 118 compares the correlation numbers that were computed among the multiple template matching at S420, S428. The module 118 determines the highest correlation number at S432. At S434, the module 118 sets as an updated template the one of the full-size and scaled templates that corresponds to the highest correlation number. In this manner, the module 118 determines one of the full-size and scaled templates that best match the feature in the current frame.

While one embodiment contemplates using the same/original templates (i.e., the full-size template computed for the reference frame at S414 and the original scaled template generated from the full-size template determined at S414) for processing each frame throughout the course of the tracking, a preferred embodiment generates and applies an updated template for the processing of each next frame. The process of updating the templates between frames can provide more accurate measurements for the updated locations. The updated templates can reduce the inaccuracy caused by camera projective distortion when the distortion is within tolerable limits between adjacent frames. Each updated template and location can be (temporarily) stored for use in the calculations.

The template can be updated using the image data of the current frame and the updated location of the feature that was identified in the current frame that corresponds with the template having the highest correlation number. More specifically, the updated template is set as the updated full-size template for processing the next frame in the sequence. In one embodiment, the tracking at S416 repeats for each frame until the vehicle (i.e., tracked object) is no longer located in the target area being monitored. A determination of whether the vehicle location is within the bounds of the target area can be performed using any process understood in the art. Namely, the updated location can be compared to the bounds of the target area to determine whether the vehicle is inside or outside the defined target area. In another contemplated embodiment, the tracking S416 can continue until the module 118 determines that the vehicle stops. The module 118 can apply any process understood in the art for determining vehicle stoppage. One process includes comparing the vehicle locations across frames. For computed locations that are the same (and, more specifically, include differences no greater than a pre-specified threshold, such as, 1 foot) across a consecutive number N of frames, the vehicle is determined as being stopped.

The vehicle determination module 118 determines if the current frame is the last frame that includes the tracked vehicle in the defined target area or if a violation has occurred at S436. For the current frame not being the last frame including the tracked vehicle (NO at S436), the module 118 sets the next frame as the current frame at S438 and repeats the tracking process at S416. For the current frame being the last frame including the tracked vehicle (YES at S436), the vehicle determination module 118 transmits the tracking information to the speed computation module 120.

With continued reference to FIG. 4, the speed computation module 120, or a similarly configured enforcement module, computes a distance that the feature (i.e., the vehicle) moves between select frames in the sequence at S440. The select frames can include the first frame and the last frame in the sequence including the detected vehicle. The select frames can otherwise include any two frames assuming that the vehicle travels at the same or nearly the same speed across the frames. The distance can be calculated by comparing the identified locations of the feature across the selected two frames. More generally, the select frames can be any subset of frames ($\geq 2$) from the first to last frames. Additionally and optionally, multiple speeds can be calculated from these plurality of frames. The statistics (such as, for example, the average, minimum, maximum, and standard-deviations, etc.) of the calculated speeds can be stored for later use such as in determining speed violations, and aggressive driving behaviors, etc. The location information corresponding to the select frames can be accessed in the databases 132-136 or from a temporary storage. Using the computed distance measurement, the speed computation module 120 computes a speed measurement at S442.

In a speed enforcement application, and any similar traffic enforcement system, the disclosure contemplates using the (speed) information to determine whether the vehicle violates any traffic rule and/or regulation. Accordingly, the speed measurement in the illustrated example can be compared to a speed limit associated with the target area at S444. For a computed speed exceeding the speed limit (YES at S444), the speed computation module 120 can signal the user device 106 at S446. The user device 106 can include a server and/or computer device that is located at a local traffic enforcement authority for identifying the vehicle and/or issuing a warning and/or ticket. Alternatively, the device can be a satellite device transmitting the signal to a driver of the vehicle as notice for the vehicle to slow down. There is no limitation made herein to the user device.

Other embodiments are contemplated to compare the measured speed to a threshold that can include a predetermined speed that is above the speed limit, such as, for example, approximating a range above 5 or 10 mph above the speed limit. For a speed measurement meeting and/or falling below the speed limit (NO at S444), the method ends at S448.

Although the method in FIGS. 2 and 4 are illustrated and described above in the form of a series of acts or events, it will be appreciated that the various methods or processes of the present disclosure are not limited by the illustrated ordering of such acts or events. In this regard, except as specifically provided hereinafter, some acts or events may occur in different order and/or concurrently with other acts or events apart from those illustrated and described herein. For example, in one contemplated embodiment, the processes for determining whether the vehicle speed exceeds a limit (such, as S440-S444) can be performed prior to the determination of whether the current frame is the last frame that the vehicle is detected in and/or whether a violation is determined at S436. It is further noted that not all illustrated steps may be required to implement a process or method in accordance with the present disclosure, and one or more such acts may be combined. The illustrated methods and other methods of the disclosure may be implemented in hardware, software, or combinations thereof, in order to provide the control functionality described herein, and may be employed in any system including but not limited to the above illustrated system 100, wherein the disclosure is not limited to the specific applications and embodiments illustrated and described herein.

The method illustrated in FIGS. 2 and 4 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIGS. 2 and 4 can be used to implement the method.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for tracking a moving vehicle, the method comprising:
   detecting a vehicle, the detecting including:
      acquiring a series of temporal related image frames, and
      in an initial frame, locating a reference feature representative of a vehicle;
   setting the reference feature as a full-size template;
   tracking the vehicle, the tracking including:
      searching a current frame for a feature matching the full-size template,
      searching the current frame for a feature matching at least one scaled template,
      setting as an updated template one of the full-size and scaled templates closest matching the feature; and
   repeating the tracking using the updated template for each next frame in the series.

2. The method of claim 1 further comprising:
   using the tracking, computing a distance that the feature moves between select frames in the series using a location of the feature in the select frames; and,
   computing a speed using the distance.

3. The method of claim 1, wherein the feature includes at least one portion of a license plate.

4. The method of claim 1 further comprising:
   scaling the full-size template by a predetermined amount to generate the scaled template.

5. The method of claim 4, wherein the predetermined scaling amount is dynamic amount using at least one of camera calibration data, a current location of the feature, an average vehicle speed of a current traffic scene being monitored, and a scaling value from a previously tracked feature.

6. The method of claim 1, wherein the searching the current frame for a feature matching the full size template includes:
   computing a first correlation number for describing a similarity between the feature and the full-size template; and,
   storing the first correlation number and a location of the feature in the current frame;
   wherein the searching the current frame for a feature matching the at least one scaled template includes:
      computing a second correlation number for describing a similarity between feature and the scaled template; and,
      storing the second correlation number and the location of the feature in the current frame.

7. The method of claim 6, wherein the setting the updated template includes:
   comparing the first and second correlation numbers;
   determining a higher one of the first and second correlation numbers;

setting as the updated template the one of the full-size template and scaled template corresponding to the higher correlation number.

8. The method of claim 1 further comprising:
cropping a region around the feature; and,
setting the cropped region as the full size template.

9. A computer program product comprising non-transitory computer-readable recording media which encodes instructions for performing the method of claim 1.

10. A system for tracking a moving vehicle, the system comprising: a tracking device comprising memory which stores instructions for performing the method of claim 1 and a processor, in communication with the memory for executing the instructions.

11. A system for tracking a moving vehicle, the system comprising:
a vehicle tracking device, including:
an image capture module adapted to acquire a series of temporal related image frames
a vehicle detection module adapted to:
in an initial frame, locate a reference feature representative of a moving object;
a vehicle tracking module adapted to:
set the reference feature as a full-size template,
search a current frame for a feature matching the full-size template,
search the current frame for a feature matching at least one scaled template,
set as an updated template one of the full-size and scaled templates closest matching the feature, and
repeat the tracking using the updated template for each next frame in the series; and,
a processor adapted to implement the modules.

12. The system of claim 11 further comprising a speed computation module adapted to:
using the tracking, compute a distance that the feature moves between a first frame and a last frame that the vehicle is detected in the series;
compute a speed using the distance.

13. The system of claim 11, wherein the feature includes at least one portion of a license plate.

14. The system of claim 11, wherein the vehicle tracking module is further adapted to:
scale the full-size template a predetermined amount to generate the scaled template.

15. The system of claim 14, wherein the predetermined amount is a dynamic amount being computed using one of camera calibration data, a current location of the feature, an average vehicle speed of a current traffic scene being monitored, and a scaling value from a previously tracked feature.

16. The system of claim 12, wherein the vehicle tracking module is further adapted to:
compute a first correlation number for describing a similarity between the feature and the full-size template; and,
compute a second correlation number for describing a similarity between feature and the scaled template; and,
store the first and second correlation numbers with a location of the feature in the current frame.

17. The system of claim 16, wherein the vehicle tracking module is further adapted to:
compare the first and second correlation numbers;
determine a higher one of the first and second correlation numbers;
set as the updated template the one of the full-size template and scaled template corresponding to the higher correlation number.

18. The system of claim 12, wherein the vehicle detection module is further adapted to:
crop a region around the feature; and,
set the cropped region as the full size template.

19. The system of claim 12 further comprising a video capture device adapted to capture the temporal related image frames and transmit the frames to the vehicle detection module.

20. A method for tracking a moving vehicle, the method comprising:
detecting a vehicle, the detecting including:
acquiring a series of temporal related image frames, and
in an initial frame, locating a reference feature representative of a moving object;
setting the reference feature as a full-size template;
scaling the full-size template predetermined amounts to generate multiple scaled templates;
tracking the moving object, the tracking including:
searching the current frame for a feature matching the scaled templates,
computing a correlation number for describing a similarity between the detected feature and each of the full-size template and scaled templates;
setting as an updated template one of the full-size template and scaled templates corresponding to highest correlation number; and
storing a location of the feature in the current frame associated with the highest correlation number; and,
repeating the tracking for each next frame in the series.

* * * * *